United States Patent [19]

Lee

[11] 4,383,586

[45] May 17, 1983

[54] ADJUSTABLE LINKAGE

[75] Inventor: Shih-Ying Lee, Lincoln, Mass.

[73] Assignee: Setra Systems, Inc., Natick, Mass.

[21] Appl. No.: 265,089

[22] Filed: May 19, 1981

[51] Int. Cl.³ .................. G01G 3/08; G01G 21/24; E04G 3/00

[52] U.S. Cl. .................. 177/229; 177/255; 248/274

[58] Field of Search .............. 177/229, 255; 248/274

[56] References Cited

U.S. PATENT DOCUMENTS

| | | |
|---|---|---|
| 3,443,653 | 5/1969 | Marshall . |
| 3,590,933 | 7/1971 | Forman . |
| 3,704,846 | 12/1972 | Clark .................. 248/274 X |
| 3,986,571 | 10/1976 | Strobel . |
| 4,020,686 | 5/1977 | Brendel . |
| 4,022,288 | 5/1977 | Canevari . |
| 4,062,416 | 12/1977 | Berg et al. . |
| 4,062,417 | 12/1977 | Kunz . |
| 4,065,962 | 1/1978 | Shoberg . |
| 4,072,202 | 2/1978 | Storace . |
| 4,143,727 | 3/1979 | Jacobson . |
| 4,153,124 | 5/1979 | Knothe et al. . |
| 4,153,126 | 5/1979 | Knothe et al. . |
| 4,170,270 | 10/1979 | Sette et al. . |
| 4,184,557 | 1/1980 | Kunz . |

*Primary Examiner*—George H. Miller, Jr.
*Attorney, Agent, or Firm*—Kenway & Jenney

[57] ABSTRACT

Mechanical linkage comprising two pairs of flexure elements constrains the motion of a reference member to be along a reference axis even in the presence of applied moments. The linkage includes a pair of V-shaped flexure elements coupled at their vertex ends to the reference member at points along the reference axis. One of these flexure elements is coupled at its distal ends to a support member fixed with respect to the reference axis. The other of the V-shaped flexure elements is coupled at its distal ends to one of a pair of elongated flexure elements at a point between its two ends. The pair of elongated flexure elements are affixed at one end to the support member and at their other end are adjustably coupled to the support member. This arrangement permits "fine tuning" of the reference axis so that the linkage exhibits the desired high resistance to moments applied to the reference member.

5 Claims, 1 Drawing Figure

ADJUSTABLE LINKAGE

REFERENCE TO RELATED APPLICATION

The subject matter of this application is related to that of U.S. patent application Ser. No. 265,088, Weighing System, filed on even date herewith.

BACKGROUND OF THE INVENTION

The present invention is in the field of mechanical linkages, and more particularly, relates to linkages for controlling motion of an element to be along a reference axis.

Linkages for constraining motion of an element to be along a reference axis are particularly useful in weighing systems, or scales, where it is desired to sense the weight of an object. Such systems require transfer of the gravitational force of the object, for example, in a weighing pan, to a force sensor without the introduction of error components due to friction and other sources. Typically, off-center loading of the object in the pan leads to moments being applied to the various elements linking the pan to the sensor. These moments, in turn, generally produce additional forces along the sensitive axes which may cause measurement error.

In the prior art, it is known to reduce the effect of off-center loading by coupling the weighing pan to the sensor by a parallelogram linkage. In one form, a pair of V-shaped flexure (or hinged) elements, each having a vertex portion and a pair of distal end portions, is configured with the distal end portions being affixed to a support member or casing, so that the V-shaped members lie in parallel planes. A connecting link is fastened between the vertex portions of the flexure elements. With this configuration, in order to precisely constrain the motion of the reference member coupled to the link to a motion along that reference axis, the V-shaped elements must be precisely positioned with respect to the support member in order to achieve the desired parallelism. With this configuration, the motion of the reference member is highly resistant to applied moment. However, as a practical matter, the precise positioning of the V-shaped elements requires critical alignment of those elements during fastening the distal ends of those elements to the support member.

It is an object of the present invention to provide an improved linkage for constraining the motion of an element to motion along a reference axis.

SUMMARY OF THE INVENTION

Briefly, the present invention is directed to a linkage for constraining motion of a reference member to be along a first reference axis. The linkage includes a vernier control assembly to permit "fine tuning," or adjustment of the linkage to provide a precisely controlled motion of the reference member along the desired axis, even in the presences of applied moments. The linkage includes a pair of elongated flexure members, each having one end affixed to a support member and the other end adjustably coupled to the support member so that the latter end may be selectively positioned in the direction of the first reference axis. The elongated flexure members are affixed to support member at points lying along a second reference axis which is perpendicular to the first reference axis.

The linkage further includes two V-shaped flexure elements, each having a vertex end portion and a pair of distal end portions. The vertex end portions of the flexure elements are coupled to the reference member at points offset by distance X in the direction of the first reference axis. The distal end portions of one of the V-shaped flexure elements is coupled to the support member at points lying along a third reference axis, where the third reference axis is parallel to the second reference axis. The distal end portions of the other V-shaped flexure element are coupled to an associated one of the elongated flexure members at a point between its two ends.

With this configuration, the parallelism of the two V-shaped flexure elements may be precisely aligned by adjustment of the adjustable coupling at the ends of one or both of the elongated flexure members. When so adjusted, the linkage is highly resistant to moments applied to the reference member.

BRIEF DESCRIPTION OF THE DRAWINGS

The foregoing and other objects of this invention, the various features thereof, as well as the invention itself, may be more fully understood from the following description, when read together with the accompanying drawings in which the FIGURE shows an exemplary embodiment of the present invention.

DESCRIPTION OF THE PREFERRED EMBODIMENT

Figure 1:
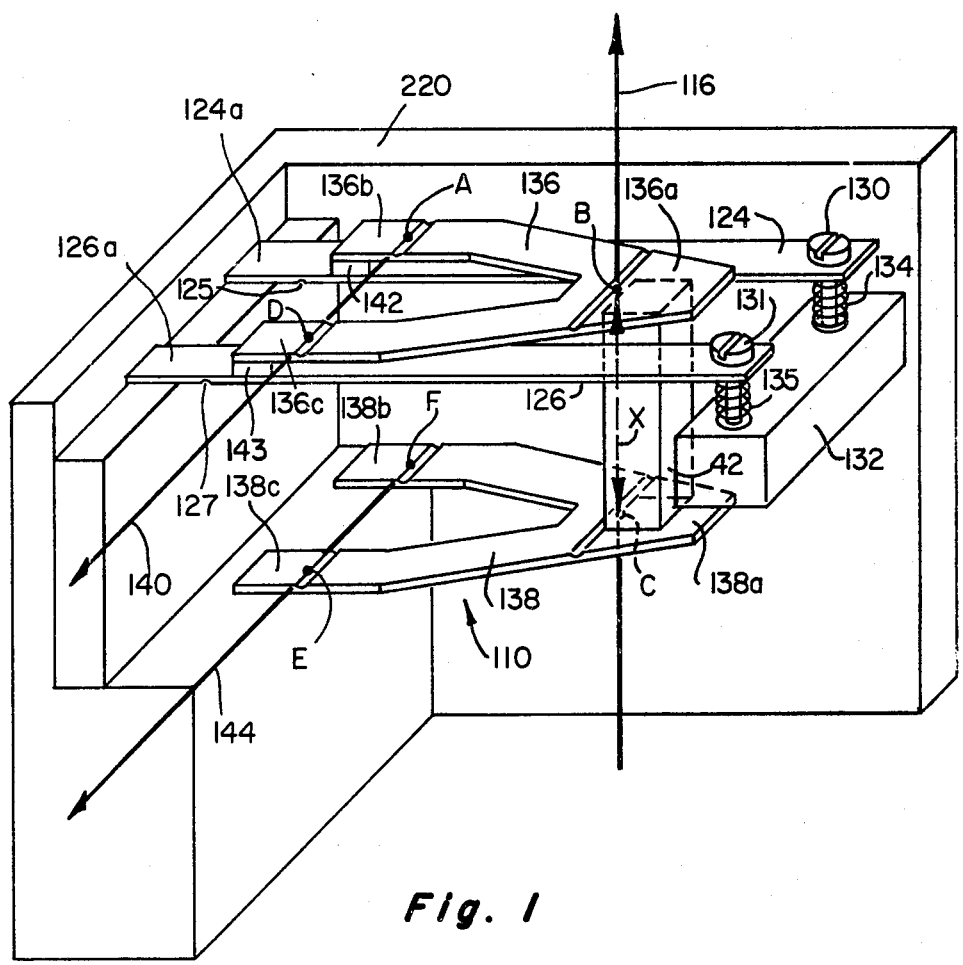

FIG. 1 shows an exemplary embodiment of the present invention. In this form, a linkage 110 is shown which is adapted for constraining the motion of a reference member 112 to be along a first reference axis 116, where that first reference axis 116 is fixed with respect to a support member 220. The linkage 110 includes a pair of elongated flexure members 124 and 126. The flexure members 124 and 126, as shown, are beams with flexures indicated by reference designations 125 and 127, respectively, positioned at one end. The flexures 125 and 127 at the ends of each of members 124 and 126 are coupled by a respective one of beam portions 124a and 126a to the support member 220.

The other end of each of members 124 and 126 is coupled by means of an adjustable coupling assembly to the support member 220. The adjustable coupling assembly for member 124 includes a screw 130 near the free end of member 124, and an associated threaded hole in an extension portion 132 of support member 220. The motion of that end of flexure 124 is opposed by a spring 134. With this configuration, the screw 130 may be turned to adjustably position the free end of flexure member 124 in the direction of axis 116.

In a similar manner, the adjustable coupling assembly for member 126 includes a screw 131 near the free end of member 126, an associated threaded hole in extension portion 132, and a spring 135. Screw 131 may be turned to adjustably position the free end of flexure member 126 in the direction of axis 116.

The linkage 110 further includes two V-shaped flexure elements 136 and 138, with each of elements 136 and 138 including a vertex end (including a flexure, or hinge) and two distal end portions (each including a flexure, or hinge). The vertex portions of the flexure elements 136 and 138 are coupled (by extension beam portions 136a and 138a beyond the vertex flexure) to the ends of the reference member 112, at points B and C, respectively, where points B and C are separated by distance X in the direction of axis 116.

The first and second distal ends of element 136 are connected at coupling points A and D, respectively, by way of extension beam portions 136b and 136c, respectively (beyond the distal end flexures) and a respective one of spacer elements 142 and 143 one of flexure elements 124 and 126 between the flexures and free ends of those members. Points A and D lie along axis 140 which is nominally perpendicular to axis 116. In the preferred form, points A and D are on the order of one-tenth of the distance from the flexure to the free end of the respective elements 124 and 126.

The first and second distal end portions of the V-shaped element 138 are coupled to the support member 220 (by extension beam portions 138b and 138c, respectively, beyond the distal end flexures) with their respective flexures positioned at points E and F, respectively. Points E and F lie on a third reference axis 144 which is perpendicular to axis 116.

When axis 140 is parallel to axis 144, and separated therefrom by distance X in the direction of axis 116, the motion of reference member 112 is constrained to be substantially along the axis 116. Moreover, the member 112 is substantially resistant to moments about axis 116.

The linkage 110 is particularly easy to adjust so that axes 140 and 144 are parallel. Generally, the screws 130 and 131 may be adjustably positioned to achieve a "fine tuning" or precise control of this parallelism. The position of points A and D along flexure elements 124 and 126 may be selected to provide a desired vernier control of the trueness of this parallelism. In the preferred form, points A and D are one-tenth the distance from the respective ones of flexures 125 and 127 to the free ends of the elements 124 and 126, respectively.

In the illustrated form of the invention, the distance between points A and B equals the distance between points D and B, and the distance between points F and C equals the distance between points E and C. These relationships permit the maximum range of motion of member 112 along axis 116, although other relationships may also be used.

In the illustrated embodiment, elements 124, 126, 136 and 138 are relatively rigid beams with flexures at discrete locations. In alternate embodiments, these elements may be replaced with elements having a distributed flexure, for example, spring steel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Linkage for constraining motion of a reference member to be parallel to a first reference axis, said first reference axis being fixed with respect to a support member, comprising:
    first and second elongated flexure members, said first and second flexure members having a flexure near one end, said one end fixedly coupled to said support member, said first and second flexure members having their other ends adjustably coupled to said support member, whereby said other ends may be selectively positioned in the direction of said first reference axis,
    first and second V-shaped flexure elements, each flexure element having a vertex end portion and flexure portions extending therefrom and terminating at first and second distal end portions,
    wherein said vertex end portions of said first and second V-shaped flexure elements are fixedly coupled to said reference member at a respective one of points B and C, said points B and C being separated by distance X in the direction of said first reference axis,
    wherein the first and second distal ends of said first V-shaped element are fixedly coupled to a respective one of said elongated flexure elements at a respective one of coupling points A and D, said points A and D being between said flexures at said one ends and said other ends of said elongated flexure elements, and lying along a second reference axis nominally perpendicular to said first reference axis,
    wherein the first and second distal ends of said second V-shaped element are fixedly coupled to said support member at a respective one of points E and F, said points E and F lying on a third reference axis, said third reference axis perpendicular to said first reference axis,
    wherein said adjustable couplings are adjustable whereby the distance between points A and F in the direction of said first reference axis equals the distance between points D and E in the direction of said first reference axis and said second reference axis is parallel to said third reference axis and offset therefrom by distance X in the direction of said first reference axis.

2. A linkage according to claim 1 wherein said flexure members and said flexure elements include beams and hinges.

3. A linkage according to claim 1 wherein said flexure members and flexure elements have distributed flexures.

4. A linkage according to claim 1 wherein the distance AB between points A and B equals the distance DB between points D and B, and the distance FC between points F and C equals the distance EC between points E and C.

5. A linkage according to claim 4 wherein AB=FC.

* * * * *